United States Patent
Divine et al.

(10) Patent No.: US 6,622,624 B1
(45) Date of Patent: Sep. 23, 2003

(54) AUTOMATED SYSTEM FOR PRODUCING BOOKLETS ON DEMAND

(75) Inventors: Marc Divine, Bourg la Reine (FR); Yves Maestrimi, Paris (FR); Dominique Mazeiller, La Frette sur Seine (FR)

(73) Assignee: Neopost Industrie, Bagneux (FR)

( * ) Notice: Subject to any disclaimer, the term of this patent is extended or adjusted under 35 U.S.C. 154(b) by 0 days.

(21) Appl. No.: 09/631,295

(22) Filed: Aug. 2, 2000

(30) Foreign Application Priority Data

Aug. 3, 1999 (FR) .............................. 99 10067

(51) Int. Cl.[7] .............................. B41F 33/00
(52) U.S. Cl. ................ 101/484; 101/483; 399/407
(58) Field of Search .................. 101/484, 483; 100/4; 399/1, 16, 407; 271/298

(56) References Cited

U.S. PATENT DOCUMENTS

| | | | | |
|---|---|---|---|---|
| 4,368,972 A | * | 1/1983 | Naramore | 355/14 |
| 5,140,380 A | * | 8/1992 | Nakamura et al. | 270/58.05 |
| 5,460,359 A | * | 10/1995 | Toyohara et al. | 100/4 |
| 5,531,429 A | * | 7/1996 | Clark | 156/908 |
| 5,774,232 A | * | 6/1998 | Tabata et al. | 358/401 |
| 5,805,950 A | * | 9/1998 | Inglese et al. | 399/1 |
| 5,815,764 A | * | 9/1998 | Tomory | 399/1 |
| 5,823,529 A | * | 10/1998 | Mandel et al. | 271/296 |
| 5,878,999 A | * | 3/1999 | Neri et al. | 270/58.08 |
| 6,027,270 A | * | 2/2000 | Greive | 400/625 |
| 6,213,456 B1 | * | 4/2001 | Hirano et al. | 270/58.07 |
| 6,307,637 B1 | * | 10/2001 | Kujirai | 358/1.11 |

FOREIGN PATENT DOCUMENTS

EP    0 768 264 A1    4/1997

* cited by examiner

*Primary Examiner*—Andrew H. Hirshfeld
*Assistant Examiner*—Anthony H. Nguyen
(74) *Attorney, Agent, or Firm*—Sughrue Mion, PLLC

(57) ABSTRACT

Automated process for producing booklets from digital documents associated with these booklets and having to be printed beforehand, wherein firstly the number of pages in the booklet to be bound is determined on the basis of the recognition of first control signals extracted from the associated digital document, then, if this number is greater than the predetermined maximum number of elementary booklets which is then appropriate to create in order to form the booklet to be bound, on the one hand, and the number of pages in each of these elementary booklets, on the other hand, are determined and, finally, each of the elementary booklets thus determined is printed and then bound, separately and successively. The number of pages in each of the elementary booklets is determined on the basis of the recognition of second control signals extracted from the digital document.

21 Claims, 4 Drawing Sheets

AUTOMATED SYSTEM FOR PRODUCING BOOKLETS ON DEMAND

BACKGROUND OF THE INVENTION

The present invention relates to the field of the processing of mail and it relates more particularly to an automated system for producing booklets.

To the Applicant's knowledge, at the present time there does not exist on the market an entirely autonomous system that can be used in an office environment which carries out, when required, complete production of booklets, from the make-up of the individual documents forming this booklet to their fastening, if necessary passing via the insertion of advertising inserts or of other inserts and the folding of the documents.

French Patent Application No. 2,739,846 discloses a booklet finishing machine which is intended to connect a bundle of documents together and which comprises, in an integrated fashion, a document stacking and aligning module, a fastening module for these documents, a folding module and a trimming module.

However, this machine, especially because of its autonomous operation, remains somewhat limited in its functionalities. Thus, it does not allow automatic insertion of rigid inserts or of transparencies and the thickness of the booklets which the machine produces can in no case exceed the maximum thickness imposed by its fastening module. The production of a large work is therefore not easily conceivable with this type of machine of the prior art.

SUMMARY OF THE INVENTION

The present invention therefore proposes an entirely automated system which can be used very simply in a conventional office environment and which is intended for the complete production of a booklet. One object of the invention is to produce booklets of all thicknesses the thinnest ones just like the thickest ones.

Another objective of the invention is also to produce a system whose high processing rates are not reduced by the insertion of inserts, even rigid ones.

These objectives are achieved by an automated system for producing booklets in a binding unit from digital documents that are to be printed by a digital imaging device placed at the input of this binding unit, the digital imaging device and the binding unit being controlled by a general-purpose computer linked both to the digital imaging device and to the binding unit, the system comprising:

means for recognizing, in the digital documents to be printed, first control signals (S1) corresponding to each start of page;

means for recognizing, in the digital documents to be printed, a second control signal (S2) corresponding to the last page of the booklet to be printed;

means for determining the number of pages in the booklet;

means for recognizing, in the digital documents to be printed, either a third control signal (S3) corresponding to a defined end of chapter or a fourth control signal (S4) corresponding to a defined end of paragraph, if this number of pages is greater than the predetermined maximum number of sheets that can be bound by the binding unit;

means for printing, in the digital imaging device, a first part of documents whose pages precede said defined end of chapter or end of paragraph;

means for binding, in the binding unit, into a first elementary booklet, the documents thus printed;

means for printing, in the digital imaging device, at least one second part of documents whose pages follow said defined end of chapter or end of paragraph; and means for binding, in the binding unit, at least into a second elementary booklet, the documents thus printed.

Thus, with the structure of the invention, all the functions necessary for producing booklets of any thickness are carried out very simply by the combination of a conventional imaging device linked to a computer and a binding unit.

The digital imaging device comprises at least one document feed means, a printing module linked to the document feed means, in order to print the documents, and at least one document output linked to the printing module in order to deliver the documents thus printed to the binding unit, a control module furthermore being provided for controlling the printing and for synchronizing the transfer of the documents according to the orders received from the general-purpose computer.

The binding unit comprises an accumulating module linked to a document input intended to interact with the document output of said digital imaging device, a fastening module for fastening the various documents forming an elementary booklet, and an assembling module for joining together the various elementary booklets forming the booklet to be bound, a control module furthermore being provided for controlling and synchronizing these various modules according to orders received from the general-purpose computer. Preferably, this binding unit furthermore includes a folding module linked to the fastening module in order to fold the documents and a trimming module linked at the output of this folding module in order to finish the elementary booklet before it is ejected into the assembling module. They may also include an additional feed module for feeding flyleaves and/or inserts.

According to a preferred embodiment, the generalpurpose computer, the digital imaging device and the binding unit are linked together via a local communication network. The digital imaging device and the binding unit may form a common unit.

The invention also relates to the corresponding process for the production of booklets, in which firstly the number of pages in the booklet to be bound is determined on the basis of the recognition of first control signals extracted from the associated digital document, then, if this number is greater than the predetermined maximum number of sheets that can be bound together, the number of elementary booklets which it is then appropriate to create in order to form the booklet to be bound, on the one hand, and the number of pages in each of these elementary booklets, on the other hand, are determined and, finally, each of the elementary booklets thus determined is printed and then bound, separately and successively. Preferably, the various elementary booklets may furthermore be joined together to form said booklet to be bound.

The number of pages in each of the elementary booklets is determined on the basis of the recognition of second control signals extracted from the digital document.

Advantageously, the first control signals correspond to start-of-page and end-of-file characters from the digital document and the second control signals correspond to end-of-chapter and end-of-paragraph characters from the digital document.

Advantageously, each elementary booklet, other than the first elementary booklet, is provided with a complementary flyleaf printed in the digital imaging device or inserted directly into the binding unit.

According to a first alternative embodiment, the digital documents to be printed come from the digitization of original documents carried out directly in an optical read module of the digital imaging device.

According to a second alternative embodiment, the digital documents to be printed are created directly by entry via the keyboard of the general-purpose computer.

BRIEF DESCRIPTION OF THE DRAWINGS

Further features and advantages of the present invention will become more apparent from the following description, given by way of nonlimiting indication, with regard to e appended drawings in which.

DETAILED DESCRIPTION OF A PREFERRED EMBODIMENT

Figure 1:
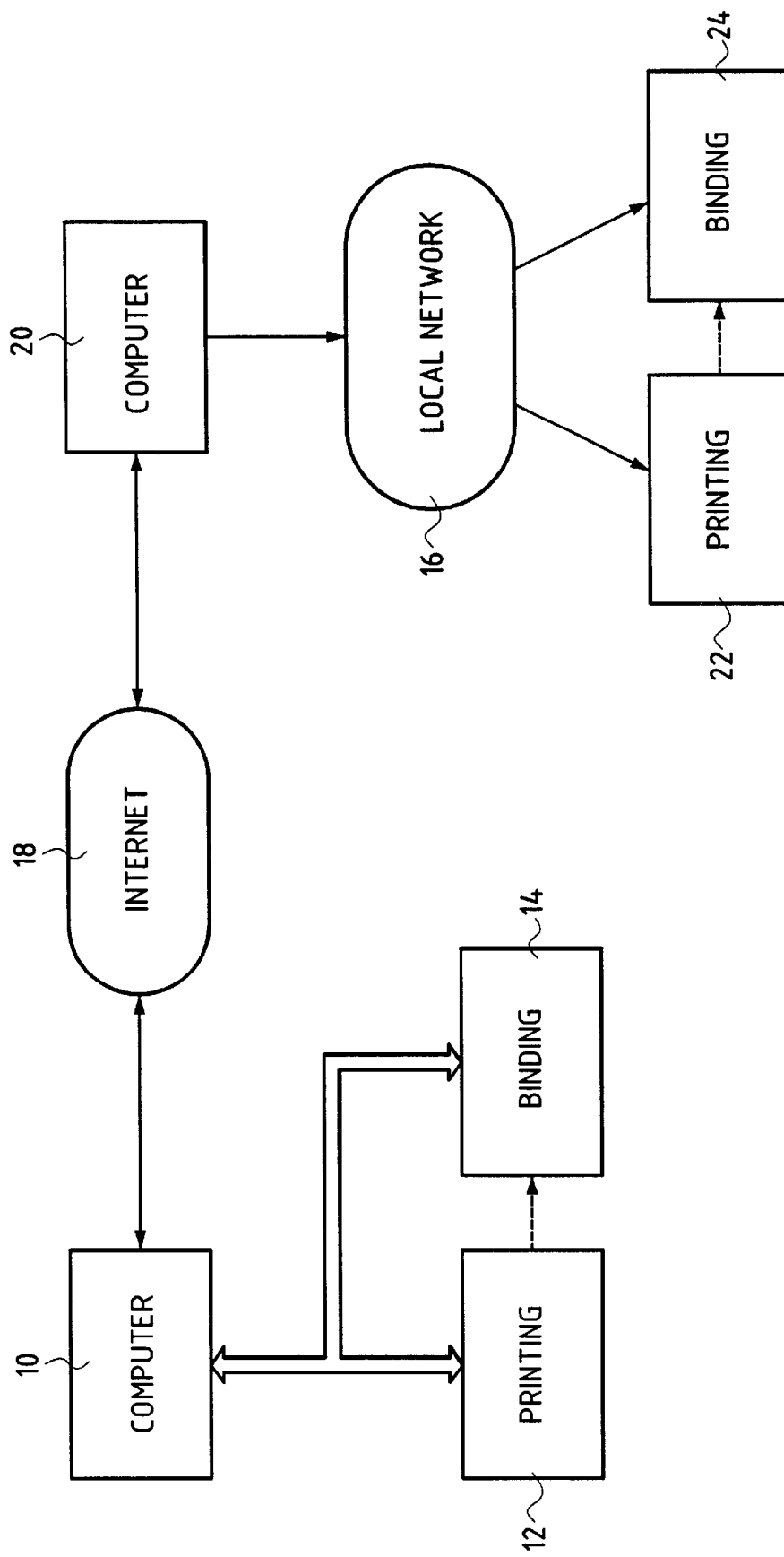
FIG. 1 shows schematically two examples of an automated system architecture for producing booklets according to the invention.

FIG. 1 illustrates, jointly (essentially for the sake of simplification) and schematically, two examples of the architecture of an automated system for producing booklets according to the invention.

In a first configuration, this system comprises a computer or microcomputer 10 linked both to a digital imaging device 12 and to a binding unit 14. In a second configuration, this system is built around a local communication network 16 to which a computer or microcomputer 20, a digital imaging device 22 and a binding unit 24 are linked.

The computer 10, 20 creates digital documents (for example by direct entry via the keyboard) and their processing (pagination, possible modification by adding, in particular, graphical elements) for the purpose of printing them in the digital imaging device 12, 22 and then of finally assembling them into booklets (binding) in the binding unit 14, 24. However, the digital documents thus created, and possibly reprocessed, in the computer may just as well have been received, in electronic mail or fax form for example, from an external communication network 18 linked to this computer 10, 20, such as the worldwide network known by the name "Internet". Of course, the aforementioned printing and binding operations, as well as the possible operation of recovering the documents to be printed via the network 18 (thus avoiding the initial entry step), are carried out under the directives of the computer 10, 20.

The three components of the aforementioned system, namely computer, imaging device and binding unit, are known per se, but their combination provides novel complementary functions which make them particularly useful for automated production of booklets.

This is because, according to the invention, the computer 10, 20 includes means, especially software, for automatically formatting the booklets (that is to say splitting the booklet to be bound into several elementary booklets) when these booklets have a number of pages exceeding the maximum fastening capacity of the binding unit. These means essentially comprise means for recognizing, in the digital documents associated with the booklet to be bound, various control signals on the basis of which this automatic formatting of the booklet may be carried out. These control signals, at least three in number, and preferably four in number, are generated automatically during the creation of the documents in the computer 10, 20 by the document processing software used for this operation (for example, the software WORD® from Microsoft). A first control signal (S1) consists of the start-of-page character generated at each start of a page, a second control signal (S2) consists of the end-of-file character indicating in general the last page of the booklet that has to be printed and then bound, a third control signal (S3) consists of an end-of-chapter character generated after each chapter and finally a fourth control signal (S4) consists of an end-of-paragraph character generated at the end of each paragraph. It will be noted that when the digital document is received via the external communication network, these various control signals are in principle also present in the imported documents. Based on these documents, the computer will determine the number of pages in the booklet to be printed and, if this number is greater than the predetermined maximum number of sheets that can be bound by the binding unit, it will determine the number of elementary booklets that it is appropriate to create in order to form this booklet, as well as the number of pages in each of these elementary booklets. Each elementary booklet can then be printed separately and successively in the digital imaging device and then bound in the binding unit. The elementary booklets, other than the first one, may if necessary be provided with a specific flyleaf.

Figure 2:
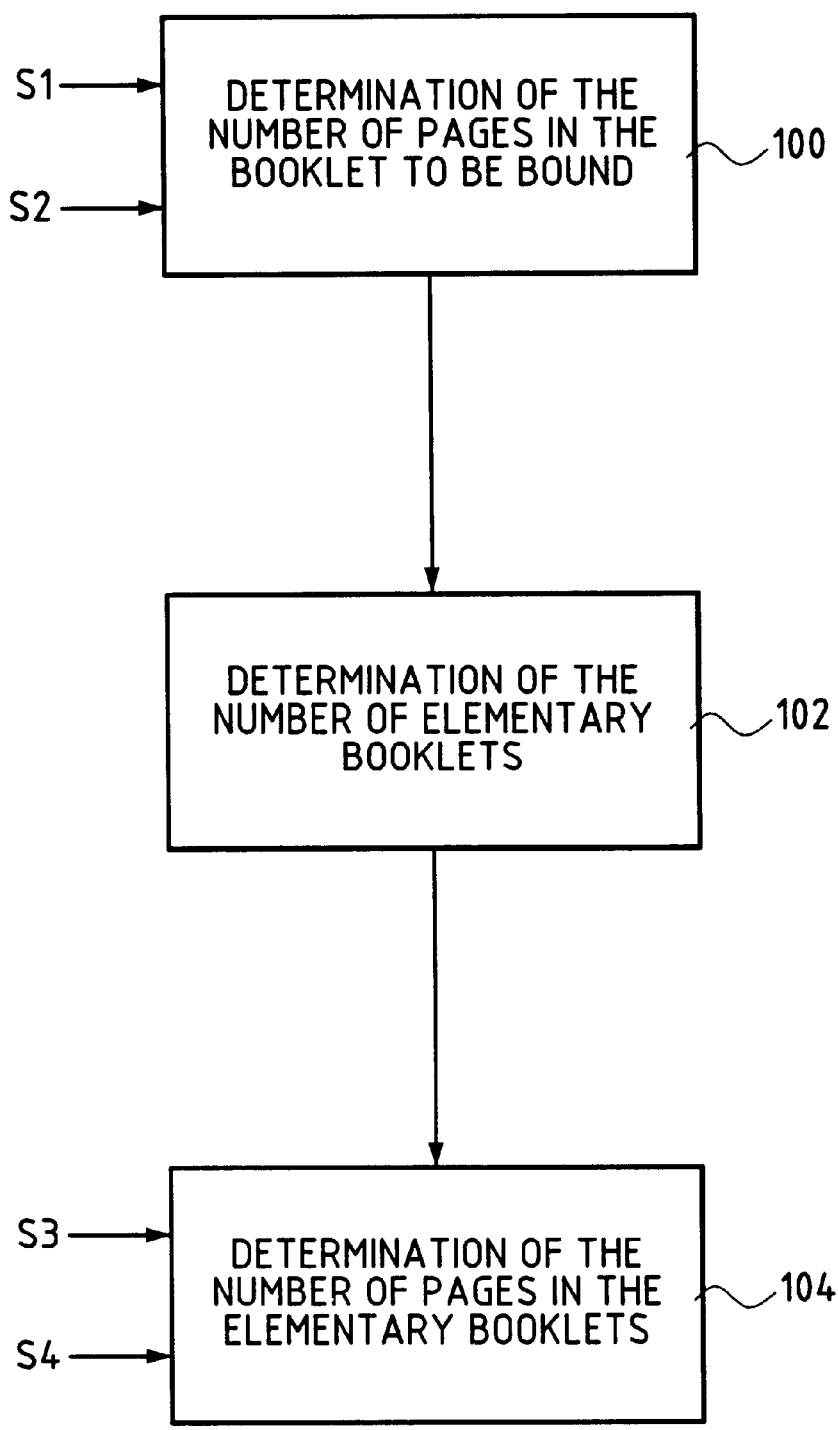
FIG. 2 is a block diagram explaining the main steps in producing the elementary booklets forming the booklet to be bond.

FIG. 2 illustrates the procedure for determining the number of pages in the elementary booklets. In a first step 100, the procedure begins by determining the number of pages in the booklet to be bound on the basis of the first (S1) and second (S2) control signals and then the number of elementary booklets is determined in a step 102. This determination of the number of booklets is carried out by dividing the number of pages in the booklet to be bound by the predetermined maximum number of sheets accepted by the binding unit. The number of elementary booklets that have to be printed then corresponds to the integer part of the result of this division increased by one.

Thus, a booklet of 70 pages that has to be bound by a binding unit accepting at most 50 sheets will be divided into 2 elementary booklets and a booklet of 112 pages into 3 elementary booklets (the number 3 corresponds in fact to the integer part from the division of 112/50=2.24 plus 1).

The number of pages in each of the elementary booklets is then determined in a following step 104, preferably by dividing the number of pages in the booklet to be printed by the number of elementary booklets determined above, the page at the end of the elementary booklet (that closest to the theoretical cutoff page) having to correspond to a page of the booklet to be bound, preferably comprising an end of chapter (identified by the signal S3) and, if missing, an end of paragraph (identified by the signal (S4).

Figure 3:
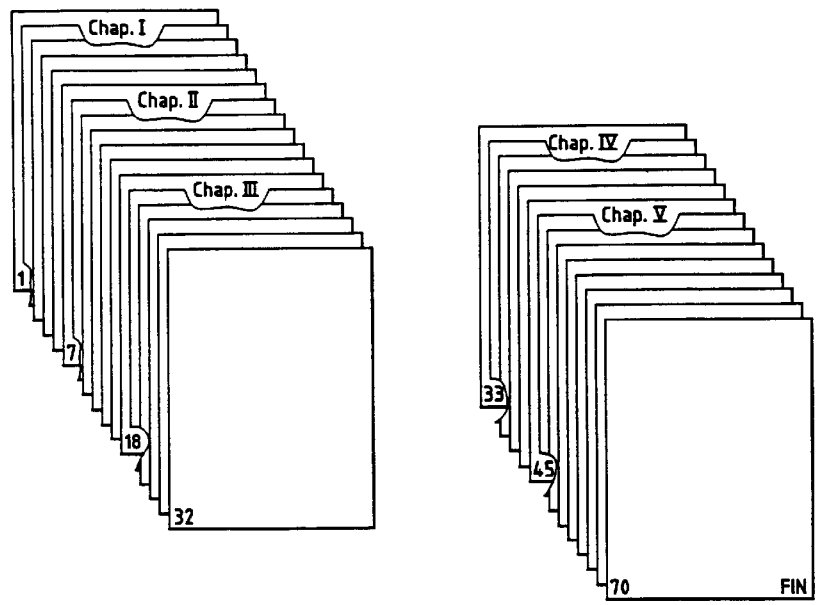
FIGS. 3 and 4 illustrate two examples of booklets being separated into individual booklets.
Figure 4:
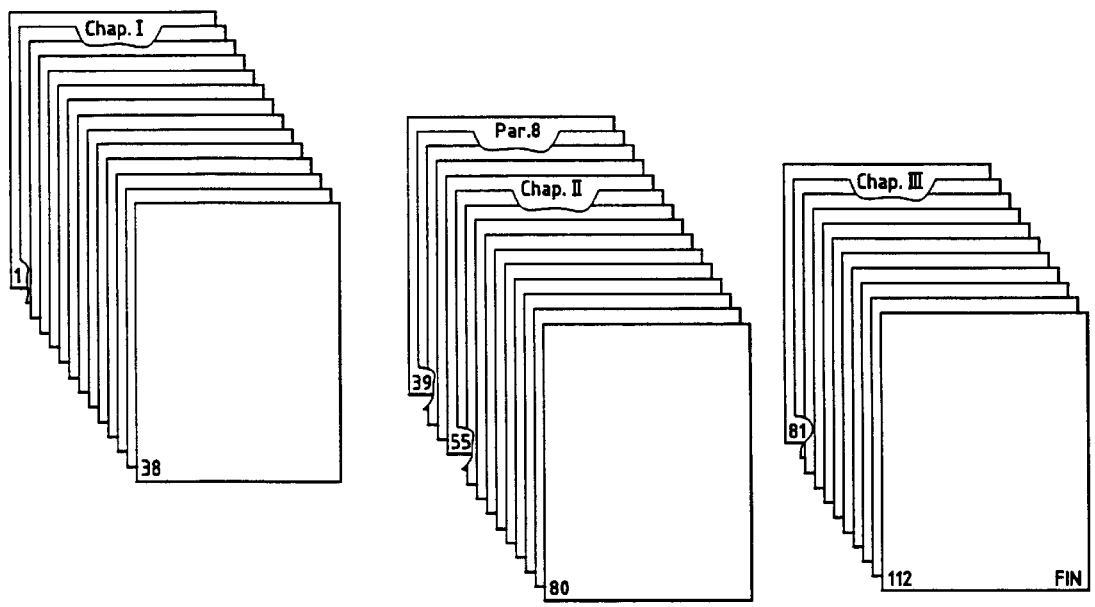

FIGS. 3 and 4 show two examples of the formatting of booklets of 70 and 112 pages, respectively. FIG. 3 shows a booklet comprising 5 chapters starting at pages 1, 7, 18, 33 and 45, respectively. By dividing the number of pages in the booklet 70 to be bound by the number of elementary booklets 2, (as indicated above), the number of theoretical pages per elementary booklet obtained is 35 pages. Since this 35th page of the booklet does not contain an end of chapter, it is therefore necessary to search for such an end of chapter on the pages coming immediately before or after. Pages 32 and 44 both meet this criterion. However, page 32 is closest to the theoretical cutoff page (page 35) and it is therefore this page that has to be adopted as the end page of the 32-page first elementary booklet. The second elementary booklet will contain 38 pages numbered from page 33 to page 70. FIG. 4 shows a 112-page booklet, the first chapter of which alone comprises 54 pages, i.e. a greater number of pages than the fastening capacity of the binding unit. Determination of the cutoff is therefore no longer possible based just on the determination of the ends of chapters, and recourse to the determination of the ends of paragraphs proves in this case to be essential. The procedure will therefore be as follows. By dividing the number of pages in the booklet to be bound 112 by the number of elementary booklets 3 (as indicated above), the number of theoretical pages per elementary booklet obtained is 37 pages. Since the 37th and 74th pages of the booklet do not contain an end of chapter, such an end of chapter will be sought on the pages coming immediately before or after. Pages 54 and 80 both meet this criterion. However, page 54 being greater than the capacity of the binding unit, an end of paragraph closest to the theoretical cutoff page (page 37) will be sought and it is therefore in fact page 38, corresponding to the end of paragraph 7 of chapter 1, which will be adopted as the end of page of this 38-page first elementary booklet. The second elementary booklet will contain 42 pages, from page 39 to page 80, and the third elementary booklet will contain 32 pages, from page 81 to the last page 112 of the booklet.

Thus, it should be noted that booklets of substantially identical size are obtained. Of course, it is possible for the procedure to be carried out differently, especially by choosing, in the case of the first elementary booklet or booklets, the maximum thickness permitted by the binding unit, the last booklet then containing the remaining pages (for example, booklets containing 44 pages, since the theoretical cutoff is 50, and 26 pages, respectively, in the case of a 70-page booklet).

Figure 5:
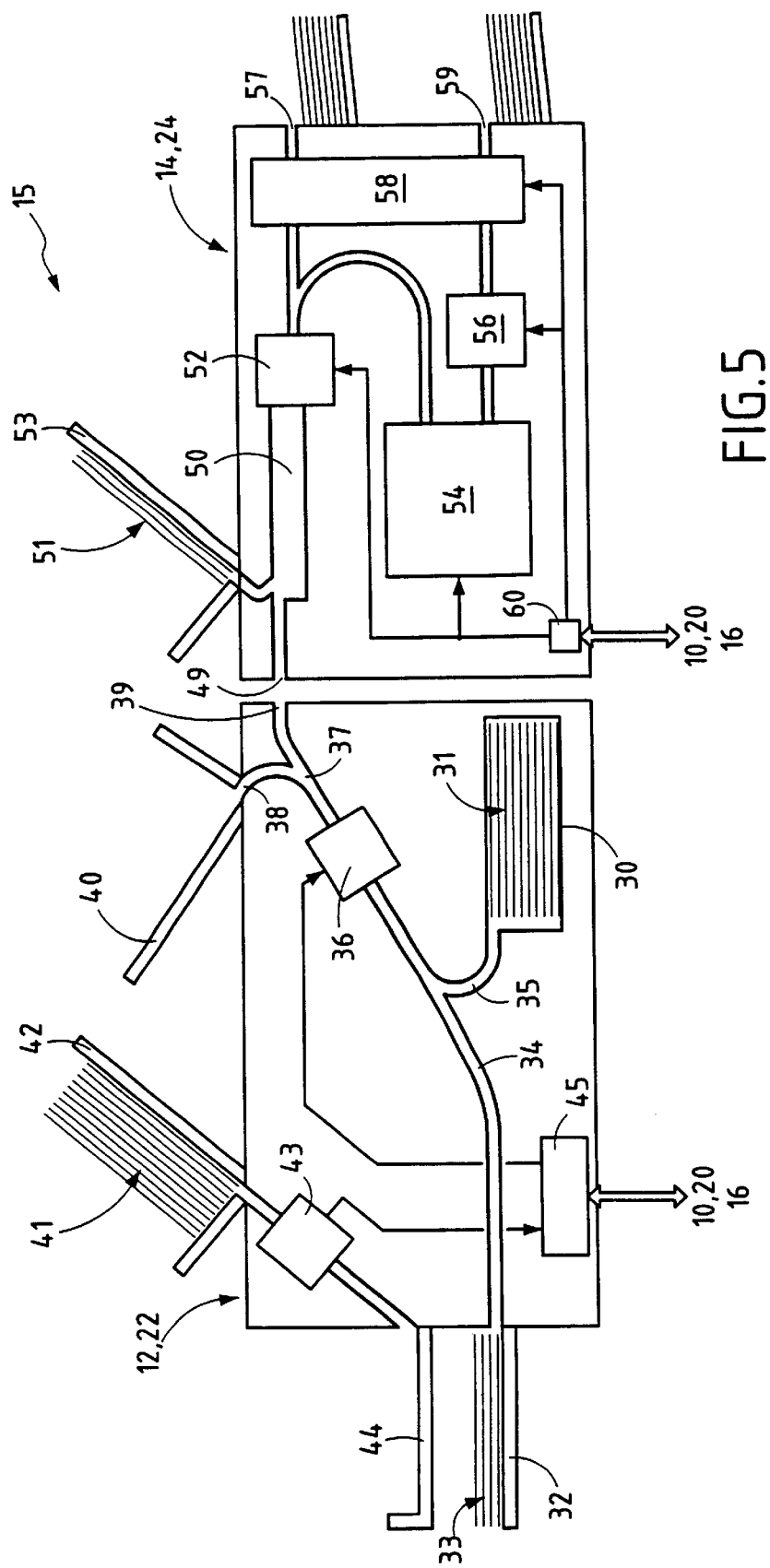
FIG. 5 illustrates the flow of a document in two essential components of the system in FIG. 1.

FIG. 5 illustrates in greater detail the various equipment components making up the digital imaging device and the binding unit.

The digital imaging device 12, 22 is preferably a general-purpose multifunction device providing both a printing function, advantageously printing in color, of the laser or ink-jet type, and a digitization function, preferably also in color. Its operation, in autonomous mode or from the computer 10 (possibly via the local network 16), is carried out very conventionally by means of software means known per se. In particular, this device can be used, on the one hand, as any document-printing terminal in conjunction with standard commercial office software, such as Word, Excel or Access for example (software from Microsoft Corporation) installed in the computer 10, 20 and, on the other hand, as any color digitization terminal (scanner) or color document-reproduction terminal (copier).

This device 12, 22 conventionally comprises a first feed means 30 for receiving virgin documents 31 which are to be printed and which will form the booklets and a second feed means 32 for receiving inserts 33 (or transparencies) intended, for example, to form the cover for the booklets. The document feed means 30 may be produced, for example, in the form of an external loading tray or, as illustrated, in the form of a side-loading slot-in magazine. Likewise, the insert feed means 32 may be produced, for example, in the form of a side-loading slot-in magazine or, as illustrated, in the form of an external loading tray. Transporting paths 34, 35 (the transporting rollers and their drive means have not been shown) allow these documents and inserts to be transported to a printing module 36 (as a variant, the inserts may be directed directly to an output of the device). This module advantageously consists of a printing drum (in the case of laser printing) or a thermal printing head (in the case of ink-jet printing). At the output of the printing module another transporting path 37 allows the printed document to be directed to a first output 38 or a second output 39 of the device. The first output 38 feeds a first receiving tray 40, placed conventionally on an upper part of the device, and intended to receive the printed documents in the context of conventional utilization in autonomous mode (scanner or copier function) or in combination with the general-purpose computer 10, 20 (printing function), the second output 39, advantageously placed to the rear of the device, being intended to feed the binding unit 14, 24 directly at its document input.

This digital device 12, 22 furthermore comprises a third feed means produced, for example, in the form of an external front-loading tray 42 for receiving documents 41 to be digitized, which documents will constitute original documents from which virgin documents (coming from the tray 30) may be printed for the purpose of producing booklets. These documents, after passing in front of an optical read module 43 will then be available in a front part of the device at a second receiving tray 44. A control module, advantageously a microprocessor module 45, is, of course, provided in the device in order to control both the digitization (in conjunction with the module 43) and the printing (in conjunction with the module 36) and for synchronizing the transportation of the documents along the various transporting paths 34, 35, 37 of the device. This control module makes use, of course, of an external link to the computer, directly (in the case of the computer 10) or via the local network 16 (in the case of the computer 20).

The binding unit 14, 24 comes from a conventional unit, for example of the type described in the aforementioned Patent Application FR 2,739,846. It is essentially composed of an accumulating module 50 linked to an input 49 of this unit and intended to receive, one by one, the documents (and possibly the inserts 51 introduced via a feed tray 53) which are to form the booklet to be bound, a fastening module 52 for fastening the bundles of documents thus stacked (preferably with loop fasteners), a folding module 54 placed at the output of the accumulating module in order, possibly, to fold these bundles and a trimming module 56 placed at the output of the folding module in order to cut and jog the bundles thus folded. Once each elementary booklet has been produced, and depending on whether it has been folded (and therefore whether it has passed through the folding module) or not, it is connected to an assembling module 58 which will join the elementary booklets together (for example by linking the various loops of the fasteners together by metal rods) before ejecting them either via a first output 57 of the binding unit or via a second output 59. A control module, advantageously the microprocessor module 60, is, of course, provided in the device in order to control both the fastening (in conjunction with the module 52), the folding (in conjunction with the module 54), the trimming (in conjunction with the module 56) and the final assembling (in conjunction with the module 58) and for synchronizing the transportation of the documents between the various modules of the device. This control module 60 also has an external link with the computer, directly (in the case of the computer 10) or via the local network 16 (in the case of the computer 20).

The computer 10, 20 is a general-purpose computer, for example a personal computer of the PC type or the like (but a workstation or a network computer are also suitable), conventionally comprising a central processing unit to which are linked, via a standardized link bus, program memories (for example of the ROM, EEPROM or similar type), data memories (of the RAM or equivalent type) and several input/output modules. These modules conventionally provide the interface between the central processing unit of this computer and, on the one hand, the digital imaging device 12, 22 and the binding unit 14, 24 and, on the other hand, various peripherals associated with this central processing unit, such as a keyboard, a pointing unit (especially a control ball or mouse), a display terminal (for example a plasma display or a liquid-crystal display), a data storage device (such as a hard disk, a magnetic cassette, a CD or DVD-ROM), a modulator/demodulator (this being analog, ADSL or of the modem-cable type depending on the nature of the link to the networks 16, 18).

The computer contains, apart from the various software means for providing the various document processing functions (especially graphical functions) and the booklet production functions which were described above, means for providing conventional fax-sending and fax-receiving functions, as well as functions of receiving and sending electronic mail on the Internet.

The complete production of a booklet is carried out in the following way. After the documents making up the booklet to be bound have been created in the computer 10, 20 (or received via the external network 18), the latter will recognize the various control signals for determining the number and the thickness of the elementary booklets to be bound, before controlling, (via the control module 45) the successive printing of these elementary booklets in the digital imaging device 12, 22 from the virgin documents 31 contained in the selection tray 30. The printed documents are then, still under the control of the computer, directed one by one to the binding unit 14, 24 where they are stored in the accumulating module 50 before being fastened (in the module 52) and possibly folded by the folding module 54. The bound elementary booklet is then directed to the assembling module 58 (after trimming 56 in the case of prior folding) of the binding unit (in the absence of folding the booklet is sent directly to this module 58) where it is stored until ready to receive the following elementary booklets that are to form the complete booklet to be bound. Once these elementary booklets have been received by the assembling module, these booklets are assembled into a single booklet which is ejected via the output 57 or 59. The flyleaves of the various booklets are inserted directly into the binding unit in the feed tray 53 or come from the imaging device (after printing or not).

It may be noted that once the phase of fastening an elementary booklet has been completed, the printing of another elementary booklet may be started by the computer 10, 20 without waiting for an elementary booklet to be completely finished. This work, called work in background time, allows the booklet production rates to be considerably increased.

It will have been noted that the document to be printed extracted from the magazine 30 may also be produced internally in the device 12, 22 based on the digitization of one or more documents by the optical read module 43, the digitization data then being sent to the computer 10, 20, via the control module 45, which recognizes the control signals for the purpose of subsequently printing these documents by the printing module 36.

The various functions provided by the present invention create a truly versatile office machine well suited to small establishments and to a booklet production unit which optimizes the balance between performance, quality and cost.

Of course, the present invention is not limited to the single preferred embodiment described, and alternative or complementary embodiments may be envisaged without departing from the scope of the invention. Thus, the assembling of the elementary booklets by the combination of rods and of loop fasteners may also be carried out by a combination of conventional fasteners with strips or a whole range of equivalent assembling means. Likewise, the digital imaging device and the binding unit may with good reason be incorporated into a single unit which is then in the form of an entirely autonomous specific office machine 15 for the production of booklets.

What is claimed is:

1. An automated process for producing booklets from digital documents having to be printed beforehand, the process comprising the steps of:
    automatically determining a number of pages in the booklet to be bound on the basis of the recognition of first control signals extracted from said digital documents,
    if said number of pages is greater than a predetermined maximum number of sheets that can be bound together, determining a number of elementary booklets necessary to form the booklet to be bound,
    determining a number of pages of each of said elementary booklets, and
    printing each of said elementary booklets and bounding them, separately and successively.

2. The process as claimed in claim 1, wherein the various elementary booklets are furthermore joined together to form said booklet to be bound.

3. The process as claimed in claim 1, wherein the number of pages in each of the elementary booklets is determined on the basis of the recognition of second control signals extracted from the digital document.

4. The process as claimed in claim 1, wherein said first control signals correspond to start-of-page and end-of-file characters from the digital document.

5. The process as claimed in claim 3, wherein said second control signals correspond to end-of-chapter and end-of-paragraph characters from the digital document.

6. An automated process for producing booklets in a binding unit (14, 24) from digital documents that are to be printed by a digital imaging device (12, 22) placed at the input of this binding unit, the digital imaging device and the binding unit being controlled by a computer (10, 20) linked both to the digital imaging device and to the binding unit, the process comprising the following steps:
    recognizing, in the digital documents to be printed, first control signals (S1) corresponding to each start of page;
    recognizing, in the digital documents to be printed, a second control signal (S2) corresponding to the last page of the booklet to be bound;
    automatically determining the number of pages in the booklet;
    if this number of pages is greater than the determined maximum number of sheets that can be bound by the binding unit, recognizing, in the digital documents to be printed, either a third control signal (S3) corresponding to a defined end of chapter or a fourth control signal (S4) corresponding to a defined end of paragraph;
    printing, in the digital imaging device (12, 22), a first part of documents whose pages precede said defined end of chapter or end of paragraph;
    binding, in the binding unit (14, 24), into a first elementary booklet, the documents thus printed;

printing, in the digital imaging device (12, 22), at least a second part of documents whose pages follow said defined end of chapter or end of paragraph; and binding, in the binding unit (14, 24), into at least one second elementary booklet, the documents thus printed.

7. The process as claimed in claim 6, which furthermore includes a step of joining the elementary booklets together to form said booklet to be bound.

8. The process as claimed in claim 6, wherein each elementary booklet, other than the first elementary booklet, is provided with a complementary flyleaf printed in the digital imaging device or inserted directly (51, 53) into the binding unit.

9. The process as claimed in claim 6, wherein said digital documents to be printed come from the digitization of original documents carried out directly in an optical read module (43) of the digital imaging device (12, 22).

10. The process as claimed in claim 6, wherein said digital documents to be printed are created directly by entry via a keyboard of the computer (10, 20).

11. The process as claimed in claim 6, wherein the step of recognizing the third control signal (S3) is preceded by a step of determining the number of pages forming each elementary booklet.

12. The process as claimed in claim 11, wherein the step of determining the number of pages in each elementary booklet is preceded by a step of determining the number of elementary booklets that have to form the booklet to be bound.

13. The process as claimed in claim 12, wherein the step of determining the number of pages in elementary booklets is preceeded by a step of determining the integer part coming from the division of the number of pages in the booklet to be bound by the predetermined maximum number of sheets.

14. An automated system for producing booklets in a binding unit (14, 24) from digital documents that are to be printed by a digital imaging device (12, 22) placed at the input of this binding unit, the digital imaging device and the binding unit being controlled by a computer (10, 20) linked both to the digital imaging device and to the binding unit, the system comprising:

first recognizing means for recognizing, in the digital documents to be printed, first control signals (S1) corresponding to each start of page;

second recognizing means for recognizing, in the digital documents to be printed, a second control signal (S2) corresponding to the last page of the booklet to be printed;

means for automatically determining the number of pages in the booklet;

third recognizing means for recognizing, in the digital documents to be printed, either a third control signal (S3) corresponding to a defined end of chapter or a fourth control signal (S4) corresponding to a defined end of paragraph, if this number of pages is greater than the predetermined maximum number of sheets that can be bound by the binding unit;

means for printing, in the digital imaging device (12, 22), a first part of documents whose pages precede said defined end of chapter or end of paragraph; and means (52, 54, 56, 60) for binding, in the binding unit (14, 24), into a first elementary booklet, the documents thus printed wherein the printing means prints in the digital imaging device (12, 22), at least one second part of documents whose pages follow said defined end of chapter or end of paragraph; and wherein the binding means binds in the binding unit (14, 24), at least into a second elementary booklet, the documents thus printed.

15. The system as claimed in claim 14, which furthermore includes means (58) for joining said elementary booklets together into a single bound booklet.

16. The system as claimed in claim 14, wherein said digital imaging device includes at least one document feed means (30), a printing module (36) linked to the document feed means in order to print the documents, and at least one document output (39) hi linked to the printing module in order to deliver the documents thus printed to the binding unit (14, 24), a control module (45) being furthermore provided in order to control the printing and to synchronize the transporting of the documents in accordance with order received from the computer (10, 20).

17. The system as claimed in claim 14, wherein said binding unit includes an accumulating module (50) linked to a document input (49) intended to engage with the document output (39) of said digital imaging device, a fastening module (52) for fastening the various documents forming an elementary booklet, and an assembling module (58) for joining the various elementary booklets together, forming the booklet to be bound, a control module (60) being furthermore provided for controlling and synchronizing these various modules in accordance with orders received from the computer (10, 20).

18. The system as claimed in claim 17, wherein said binding unit furthermore includes a folding module (54) linked to the fastening module in order to fold the documents and a trimming module (56) linked at the output of this folding module in order to finish the elementary booklet before ejecting it into the assembling module (58).

19. The system as claimed in claim 15, wherein said binding unit furthermore includes an additional feed module (53) for feeding flyleaves and/or various inserts (51).

20. The system as claimed in claim 14, wherein the computer (20), the digital imaging device (22) and the binding unit (24) are linked together via a local communication network (16).

21. The system as claimed in claim 14, wherein the digital imaging device (12) and the binding unit (14) form a common unit (15).

* * * * *